United States Patent [19]

Taleyarkhan

[11] Patent Number: 4,740,350
[45] Date of Patent: Apr. 26, 1988

[54] BWR FUEL ASSEMBLY HAVING FUEL ROD SPACERS AXIALLY POSITIONED BY EXTERIOR SPRINGS

[75] Inventor: Rusi P. Taleyarkhan, Pittsburgh, Pa.

[73] Assignee: Westinghouse Electric Corp., Pittsburgh, Pa.

[21] Appl. No.: 888,294

[22] Filed: Jul. 22, 1986

[51] Int. Cl.$^4$ ............................................. G21C 3/34
[52] U.S. Cl. .................................. 376/441; 376/438; 376/434
[58] Field of Search ............... 376/441, 442, 438, 352, 376/446, 434

[56] References Cited

U.S. PATENT DOCUMENTS

| | | | |
|---|---|---|---|
| 3,654,077 | 4/1972 | Lass et al. | 176/78 |
| 3,802,995 | 4/1974 | Fritz et al. | 176/76 |
| 3,819,477 | 6/1974 | Fromel | 176/76 |
| 3,886,038 | 5/1975 | Raven | 176/78 |
| 3,940,314 | 2/1976 | Knodler et al. | 176/78 |
| 3,984,284 | 10/1976 | Long et al. | 176/68 |
| 4,081,324 | 3/1978 | Flora et al. | 176/78 |
| 4,478,786 | 10/1984 | Anderson et al. | 376/444 |
| 4,489,038 | 12/1984 | Nyland | 376/446 |
| 4,508,679 | 4/1985 | Matzner et al. | 376/438 |
| 4,560,532 | 12/1985 | Barry et al. | 376/434 |
| 4,585,616 | 4/1986 | DeMario | 376/438 |
| 4,588,550 | 5/1986 | Blomstrand | 376/438 |
| 4,649,021 | 3/1987 | Taleyarkhan | 376/352 |

FOREIGN PATENT DOCUMENTS

| | | |
|---|---|---|
| 2238477 | 8/1972 | Fed. Rep. of Germany . |
| 1283530 | 7/1972 | United Kingdom . |
| 0156986 | 12/1979 | Japan . |

*Primary Examiner*—Donald P. Walsh

[57] ABSTRACT

In a BWR fuel assembly, fuel rod spacers are disposed in desired axial positions along the fuel rods by a plurality of yieldably-resilient arcuate-shaped leaf springs. Some of the springs are disposed between an interior side of the fuel assembly outer channel and exterior sides of the spacers, whereas others are disposed between an exterior side of a central water cross and the exterior sides of the spacers. The springs thus contact the spacers and either the channel or water cross and exert sufficient contacting force thereon to maintain the spacers substantially stationary in the desired axial positions along the fuel rods. The springs extend generally parallel to the axial direction of the fuel rods and are spaced apart from one another in a direction generally transverse to such fuel rod axial direction. Each spring can be fixedly attached at one end to the spacer or clipped on an edge of the spacer.

15 Claims, 5 Drawing Sheets

BWR FUEL ASSEMBLY HAVING FUEL ROD SPACERS AXIALLY POSITIONED BY EXTERIOR SPRINGS

BACKGROUND OF THE INVENTION

1. Field of the Invention

The present invention relates generally to fuel assemblies for a nuclear reactor and, more particularly, is concerned with a boiling water reactor (BWR) fuel assembly having exterior springs for axially positioning fuel rod spacers so that locating tabs on spacer capture rods within the fuel rod bundle which degrade critical heat flux (CHF) performance can be eliminated.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In a typical boiling water reactor (BWR) fuel assembly, a bundle of fuel rods are subdivided into four separate mini-bundles by a central water cross and each mini-bundle is supported in laterally spaced-apart relation by a plurality of axially displaced grids or spacers, for example six in number. Then, all four mini-bundles of the fuel assembly are encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assembly. Coolant enters through the bottom nozzle and thereafter flows along the fuel rods removing energy from their heated surfaces. Such BWR fuel assembly is illustrated and described in U.S. Pat. No. (4,560,532) to Barry et al.

A BWR consists of several hundred fuel bundles, each enclosed in its own outer tubular channel. Also, as mentioned above, each mini-bundle has a plurality of spacers axially spaced apart along its fuel rods. The spacers are needed to maintain the desired fuel mini-bundle configuration and to prevent excessive fuel rod bow and flow induced vibrations, and thereby provide significant benefits from a structural standpoint.

In one arrangement disclosed in the Barry et al patent to maintain the axial positions of the spacers in the BWR fuel assembly, two pairs of tabs are provided below and above each spacer on special fuel rods, called spacer capture rods. The specific purpose of these tabs is to prevent axial dislocation of the spacers. The width of each tab (2-3 mm) is proportional to or larger than the width of dimples provided within the spacer to transversely support or hold the fuel rods. As such, these tabs can be expectd to strip off a similar amount of liquid film cooling the fuel rods, as the spacer dimples which hold the fuel rods.

Stripping off the liquid film causes premature dryout and critical heat flux (CHF). It is well known that such a stripping mechanism can cause significant deterioration in the critical power ratio (CPR). Again this effect causes greatest degradation in CPR margins, if the tabs are located flush against the spacer as the local disturbances to the liquid film on the fuel rods are compounded. Also, depending on the radial variation of rod bundle CHF characteristics, this process could further be enhanced if the tabs are on a rod located in a "limiting" CHF radial location. The CHF phenomenon in BWRs is of paramount importance in characterizing the power rating of the plant. Hence degradation of this margin should be minimized.

Another arrangement for maintaining the desired axial positions of spacers in the BWR fuel assemblies is to employ spacer holder rods which replace and are arranged in parallel with the fuel rods of the fuel assembly. Such approach has been described in U.S. Pat. No. (3,802,995) to Fritz et al and U.S. Pat. No. (4,508,679) Matzner et al. In Fritz et al, a fuel rod in a central fuel rod position is replaced by a spacer capture water tube having a plurality of radially extending, axially spaced fins or lugs, each of which is adapted to engage a respective one of the spacers to retain it in fixed axial position. Matzner et al uses lugs on moderator tubes as in the arrangement of Fritz et al for maintaining the desired axial positions of spacers of a different construction along the fuel rods. The fritz et al arrangement is applied to retain the spacer construction shown in Lass et al (U.S. Pat. No. 3,654,077). The Lass et al spacer has a peripheral support band and a plurality of sheet metal divider members and divider wires. In contrast, the Matzner et al spacer has a plurality of ferrules welded together and encompassed by a peripheral band. The band has a pair of inwardly curved projections near each corner to serve as lead-ins when the outer tubular flow channel is inserted over the fuel assembly. The peripheral band also has a pair of outwardly extending lobes near each corner for providing predetermined spacing between the band and the surrounding coolant flow channel. However, a particular drawback of these spacer holder water tubes is that they take up space in the fuel assembly which could otherwise be used to receive fuel rods, thus reducing the operating economy of the reactor.

Yet another arrangement is to dispose the spacer in interlocking relation to the outer tubular channel of the fuel assembly. Such arrangement is disclosed in a U.S. Pat. No. (4,489,038) to Nylund. Nylund has a spacer comprised by upper and lower spaced frames interconnected by a resilient wall or strip. A pair of spaced apart stop projections embossed in the wall of the fuel assembly housing or channel constitute first locking means, and a stop member formed in the middle of the strip of the spacer constitutes a second locking means. When a fuel rod is inserted into the spacer cell adjacent to the stop member, it urges the resilient strip 5 toward the fuel assembly channel and thereby the stop member 6 from its inactive position to an active position where it is positioned so close to the channel that the spacer cannot be moved upwards or downwards without the stop member abutting against one of the projections 7 embossed in the channel. Preferably, the first and second locking means are located at each of the corners of the spacers and tubular channel.

However, none of these above-described arrangements appears to be the optimum solution to supporting spacers in a BWR fuel assembly so as to maintain their axially spaced positions. Consequently, the need exists for further improvement of the BWR fuel assembly with respect to spacer retention.

SUMMARY OF THE INVENTION

The present invention provides features which are designed to satisfy the aforementioned needs. Underlying the present invention is the realization that there is a simple way to support the BWR spacers which has no effect on CHF or even pressure drop so that removal of the spacer capture tabs on the tie fuel rods is feasible. Specifically, removal of the spacer tabs is compensated for by introducing springs between the exteriors of the spacers and the interior of the outer channel, and also between the spacer exteriors and the exterior of the water cross. Pressure drop is not affected since the space between the spacer exterior and the channel interior is a dead zone, with stagnant flow. Essentially the same is true with respect to the space between the spacer exterior and the water cross exterior. The compressive force exerted by the springs keeps the spacers in a stationary relationship with respect to the channel and water cross. The springs also give mechanical dampening from structural vibrations so that improved seismic and fretting performance results. The springs are either welded to the spacer exterior walls or clipped on a peripheral edge of the spacers.

Accordingly, the present invention is set forth in a fuel assembly having a plurality of spaced fuel rods, an outer hollow tubular flow channel surrounding the fuel rods so as to direct flow of coolant/moderator fluid therealong, and at least one spacer being disposed along the channel and about the fuel rods so as to maintain them in side-by-side spaced relationship. The present invention is directed to an arrangement for disposing the spacer in a desired axial position along the fuel rods and comprises a plurality of yieldably resilient elements disposed between an interior side of the outer channel and an exterior side of the spacer so as to contact the channel and spacer and exert sufficient contacting force thereon to maintain the spacer substantially stationary in the desired axial position along the fuel rods.

More particularly, each of the elements is an arucate-shaped leaf spring extending generally parallel to the axial direction of the fuel rods and spaced apart from one another in a direction generally transverse to such fuel rod axial direction. In one embodiment, each spring is fixedly attached at one end to the spacer, whereas in a modified embodiment the spring is clipped on an edge of the spacer. In each embodiment, an opposite free end of the spring is spaced outwardly from the spacer. Further, in one embodiment, the free end of the spring is dipsosed downstream relative to the direction of coolant/moderator fluid flow from the one end thereof being attached to the spacer. Alternatively, the free end of the spring can be disposed upstream relative to the coolant/moderator fluid flow direction.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
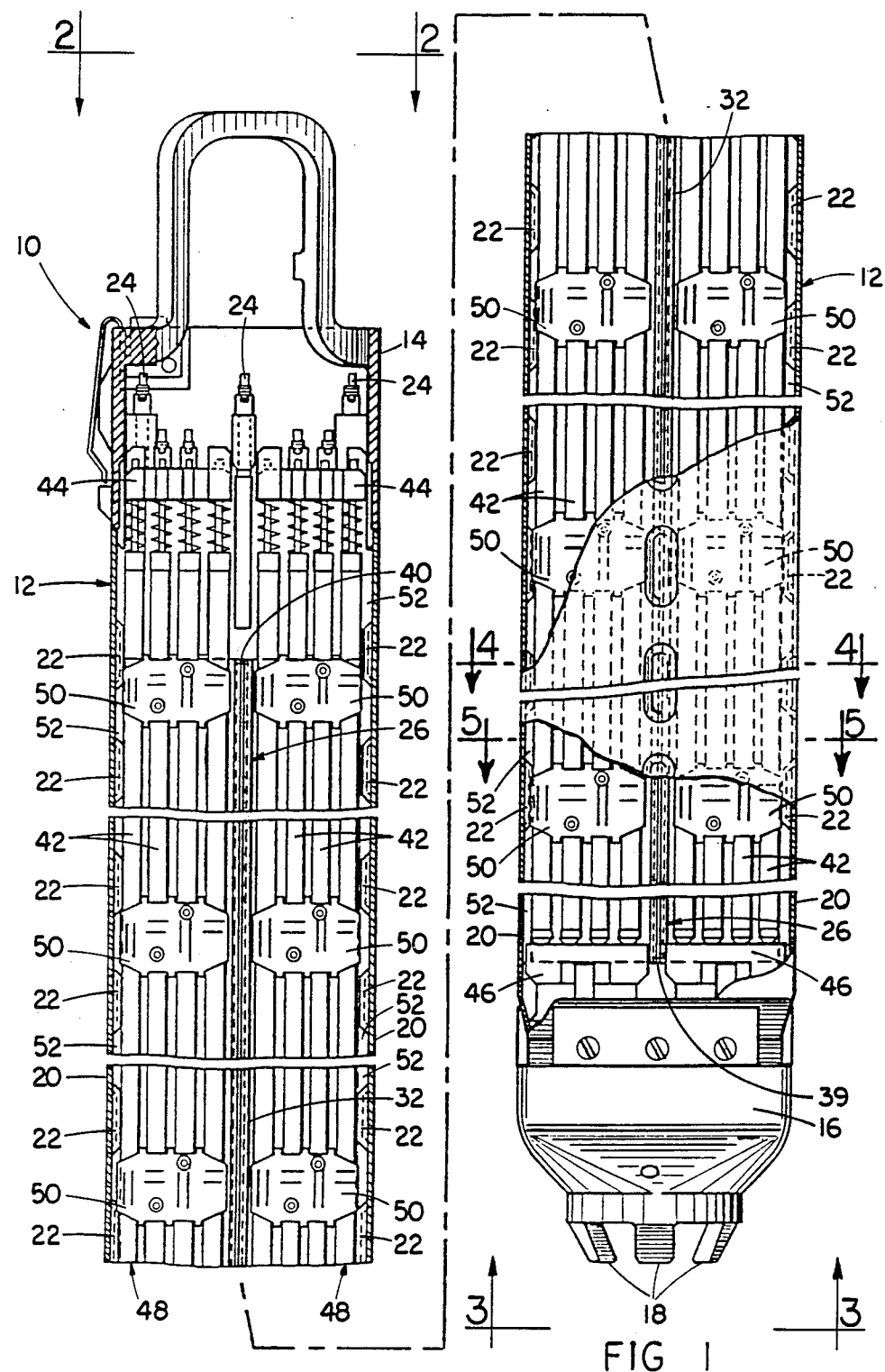
FIG. 1 is an elevational view, with parts broken away and sectioned for clarity, of a BWR nuclear fuel assembly in which exterior springs of the present invention are used to maintain the axial positions of the mini-bundle spacers.
Figure 2:
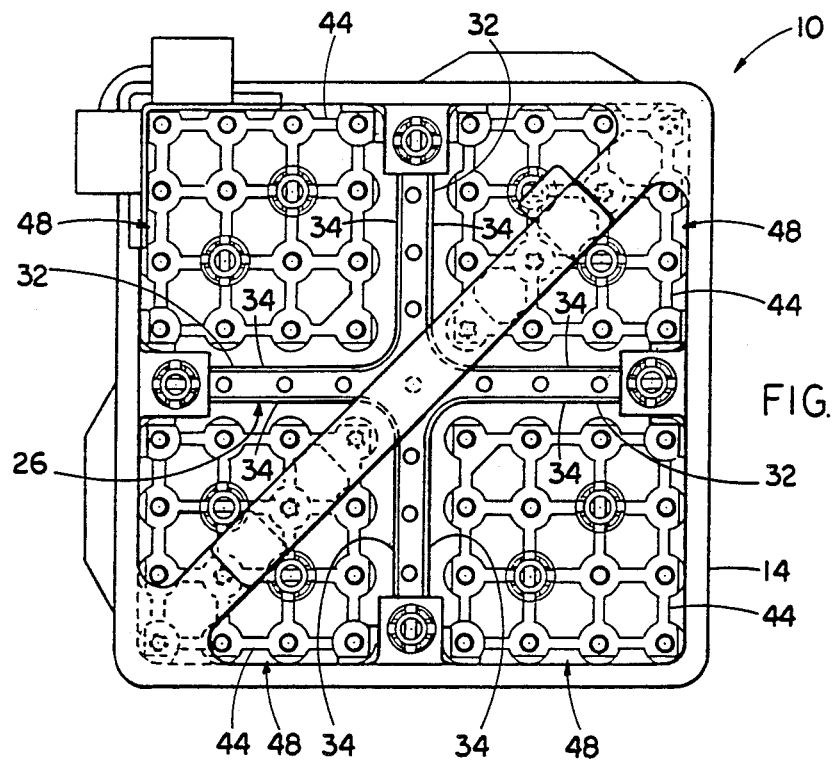
FIG. 2 is an enlarged top plan view of the BWR fuel assembly as seen along line 2—2 of FIG. 1.
Figure 3:
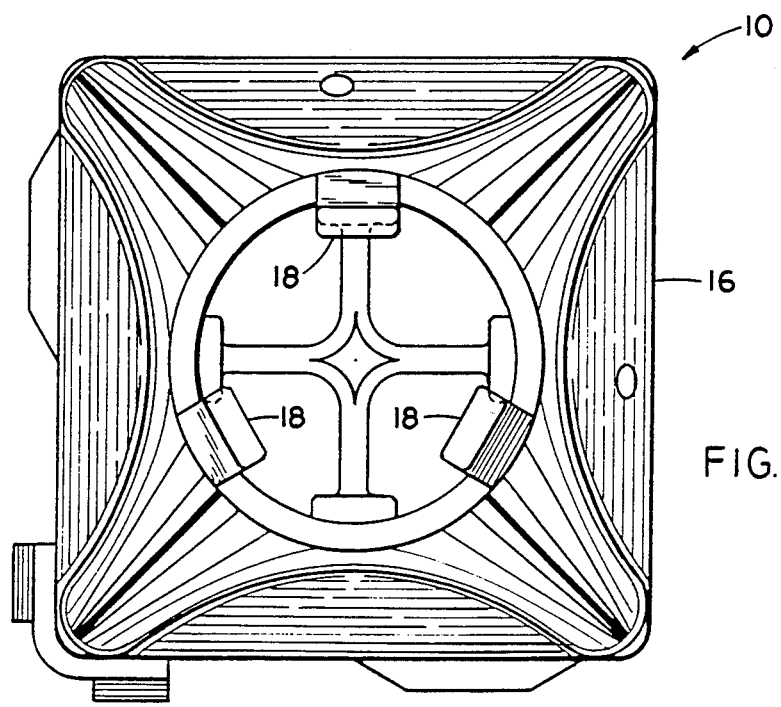
FIG. 3 is an enlarged bottom plan view of the BWR fuel assembly as seen along line 3—3 of FIG. 1.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

IN GENERAL

Referring now to the drawings, and particularly to FIGS. 1 to 7, there is shown a nuclear fuel assembly, generally designated 10, for a BWR to which the improved features of the present invention can be advantageously applied. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross, generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12 and are interconnected and spaced apart by a series of elements in the form of dimples 36 formed in the sheet members 34 of each panel 32 and extending therebetween. The dimples 36 are provided in opposing pairs that contact each other along the lengths of the sheet members 34 to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated longitudinal edges 38 of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 39 and an opposite upper flow outlet end 40 which each communicate with the inner channel 28 for providing subcollant flow therethrough.

Disposed within the channel 12 is a bundle of fuel rods 42 which, in the illustrated embodiment, number sixty-four and form an 8×8 array. The fuel rod bundle is, in turn, separated into four mini-bundles thereof by the water cross 26. The fuel rods 42 of each mini-bundle, such being sixteen in number in a 4×4 array, extend in laterally spaced apart relationship between an upper tie plate 44 and a lower tie plate 46 and connected together with the tie plates comprise a separate fuel rod subassembly 48 within each of the compartments 30 of the channel 12. A plurality of grids or spacers 50 axially spaced along the fuel rods 42 of each fuel rod subassembly 48 maintain the fuel rods in their laterally spaced relationships. Coolant flow paths and cross-flow communication are provided between the fuel rod subassemblies 48 in the respective separate compartments 30 of the fuel assembly 10 by a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 48.

The above-described basic components of the BWR fuel assembly 10 are known in the prior art, being disclosed particularly in the patent to Barry et al cited above, and have been discussed in sufficient detail herein to enable one skilled in the art to understand the features of the present invention presented hereinafter. For a more detailed description of the construction of the BWR fuel assembly attention is directed to the above-mentioned Barry et al patent.

SPACER POSITIONING SPRINGS FOR AVOIDING CHF PERFORMANCE DEGRADATION

Figure 4:
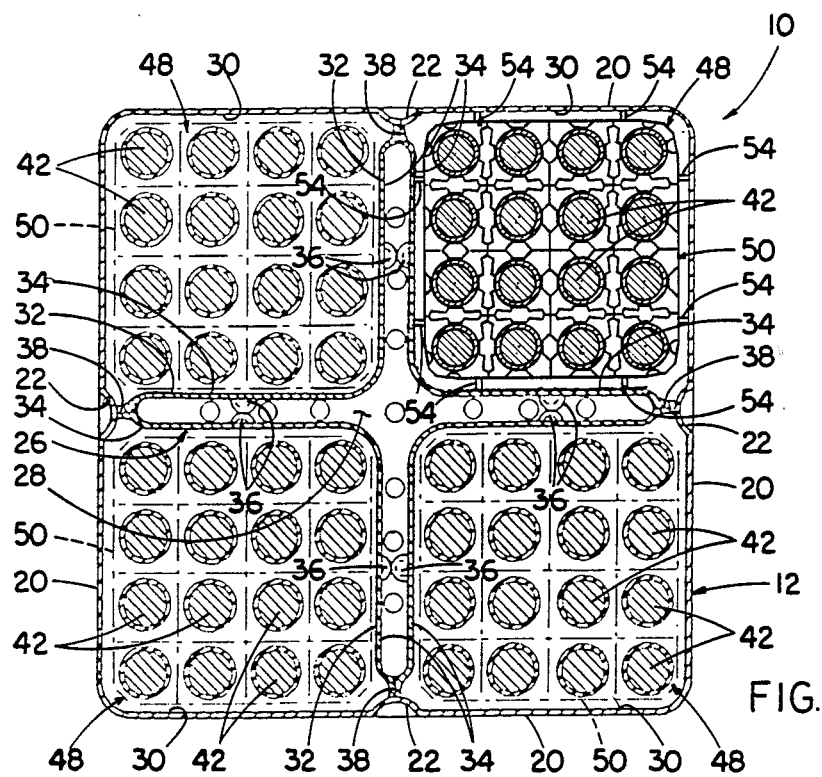
FIG. 4 is a cross-sectional view of the BWR fuel assembly taken along line 4—4 f FIG. 1, showing the fuel rod bundle of the fuel assembly being separated into separate mini-bundles by the water cross with a spacer surrounding one of the mini-bundles being shown in full, while the spacers surrounding the other three mini-bundles are shown in outline form and also showing the spacer positioning springs of the present invention located between the exterior of the one spacer, on the one hand, and the exterior of the radial panels of the water cross and interior of the outer tubular channel, on the other hand.
Figure 5:
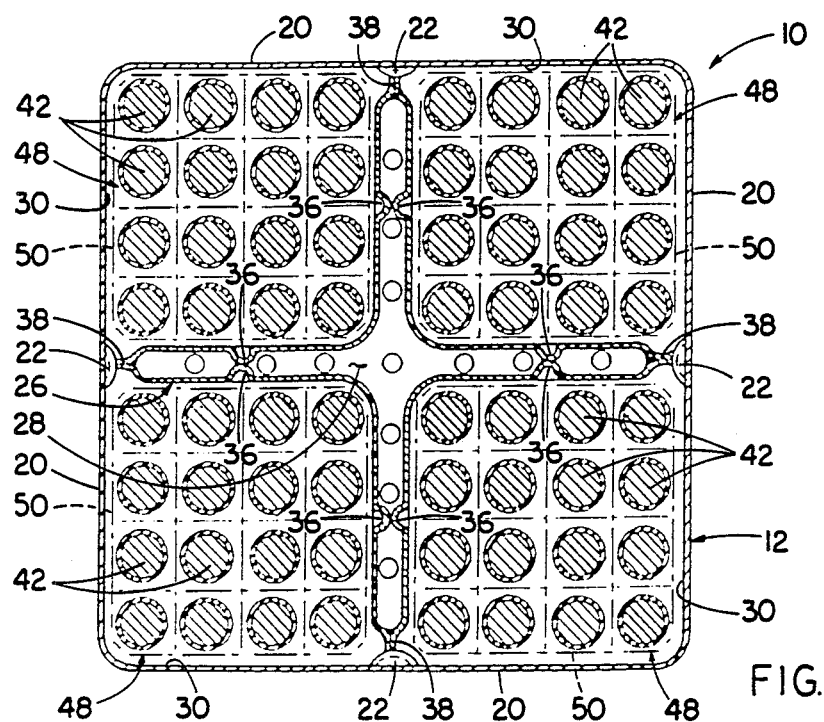
FIG. 5 is another cross-sectional view of the BWR fuel assembly similar to that of FIG. 4, but taken along line 5—5 of FIG. 1.
Figure 6:
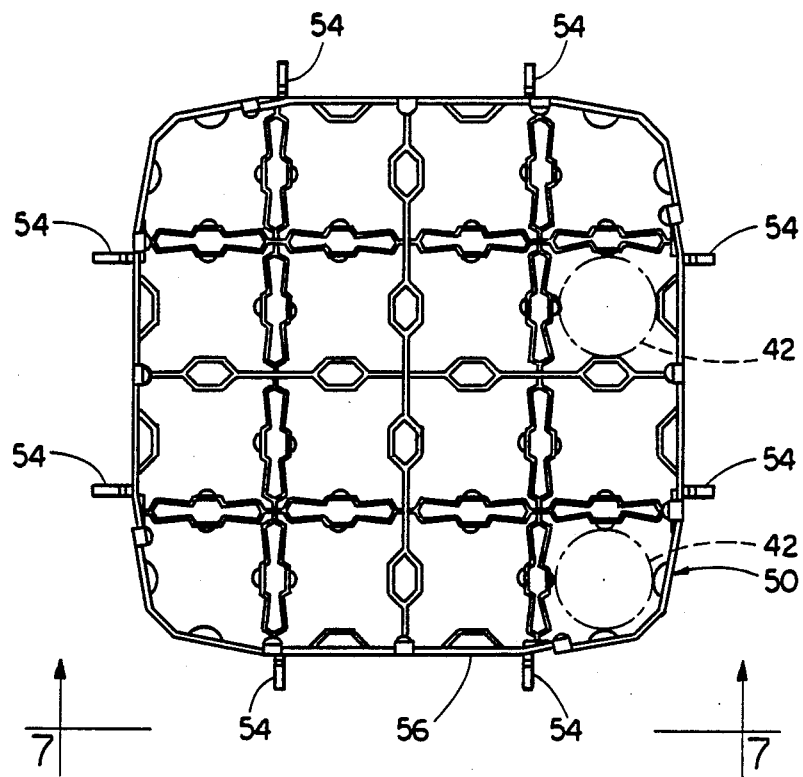
FIG. 6 is an enlarged top plan view of the upper right hand spacer seen in FIG. 4, showing the springs of the spacer in expanded positions in which they normally engage and together with opposite dimples hold the fuel rods which extend through the cells of the spacer and also showing the spacer positioning springs of the present invention on the exterior of the spacer for maintaining its axial position.

The present invention allows removal of spacer capture tabs used heretofore at least in the limiting CHF ones of the spacers 50 in the axial location (i.e., the uppermost three spacers). This is accomplished through disposing the spacers 50 in desired axial positions along the fuel rods 42 by a plurality of sets of yieldably-resilient elements in the form of arcuate-shaped elongated leaf springs 54. Some of the leaf springs 54 in each set are disposed between an interior side of the vertical walls 20 of the fuel assembly outer channel 12 and the exterior side of a flat, non-porous outer strap or wall 56 of each of the spacers 50. Others of the leaf springs 54 in each set are disposed between an exterior side of the radial panels 32 of the central water cross 26 and the exterior sides of the spacers. By way of example, there can be eight leaf springs 54 in a set associated with one spacer 50, as seen in FIG. 6. That is, two leaf springs 54 along each of the four exterior sides of the outer strap 56 of the generally rectangular spacer. As shown in FIG. 4, two pairs of the springs 54 are disposed between the spacer 50 and the channel walls 20, while the other two pairs of springs are disposed between the spacer 50 and the two of the radial panels 32 of the water cross 26.

The springs 54 thus contact the spacers 50 and either the walls 20 of the channel 12 or the radial panels 32 of the water cross 26 and exert sufficient compressive contacting force thereon to maintain the spacers substantially stationary in the desired axial positions along the fuel rods 42. The leaf springs 54 extend generally parallel to the axial direction of the fuel rods 42 and are spaced apart from one another in a direction generally transverse to such fuel rod axial direction.

The springs 54 must have an inherent spring bias directed in such a way that the springs area deflected inwardly against the bias toward the exterior sides of the spacers 50 when they are placed between the exterior sides of the spacers 50 and the interior sides of the channel 12 or exterior sides of the water cross panels 32 in order for the springs to be able to exert the compressive forces thereon. Conversely, when the springs 54 are removed from contact with the interior sides of the channel 12 or exterior sides of the water cross panels 32, they naturally deflect back to their original state away from the exterior sides of the spacers due to the direction of their inherent spring bias.

Figure 7:
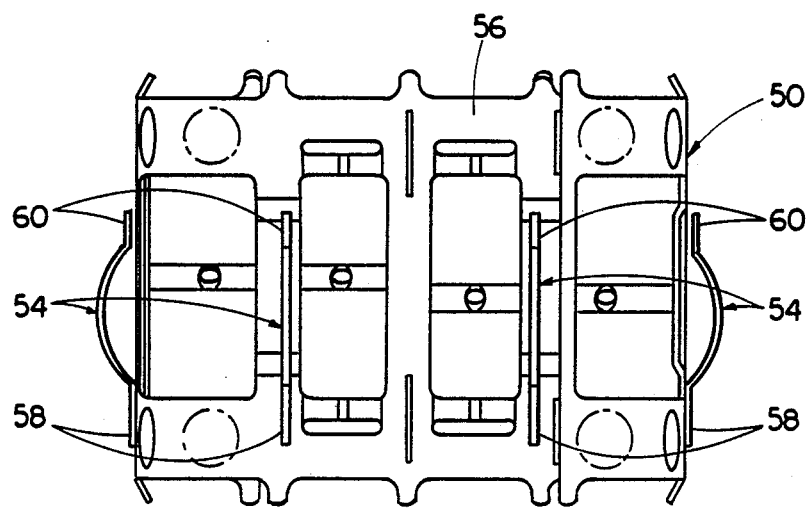
FIG. 7 is a side elevational view of the spacer as seen along line 7—7 of FIG. 6.
Figure 8:
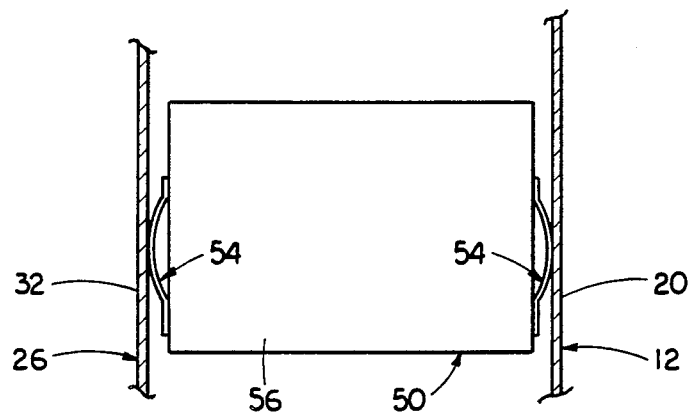
FIG. 8 is a schematical representation of fragmentary portions of the water cross and outer channel with a spacer disposed therebetween by the spacer positioning springs of the present invention.
Figures 9, 10, 11:
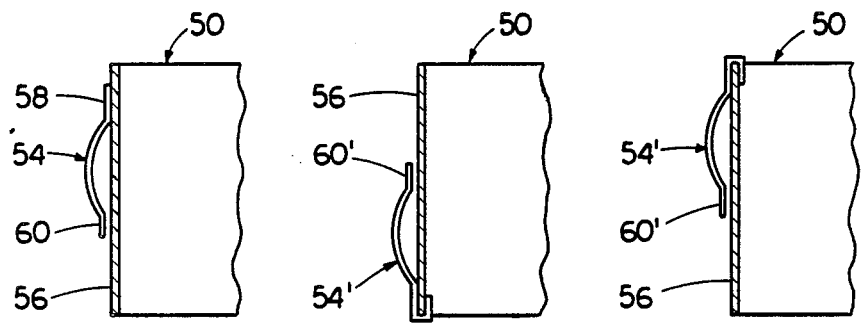
FIG. 9 is an enlarged fragmentary view of a spacer with an alternative form of the spacer positioning spring wherein its free end is oriented upstream from the opposite end thereof which is fixedly attached to the spacer outer strap.
FIG. 10 is an enlarged fragmentary view of a spacer with another alternative form of the spacer positioning spring wherein its free end is oriented downstream from the opposite end thereof which is detachably clipped on a lower peripheral edge of the spacer outer strap.
FIG. 11 is an enlarged fragmentary view of a spacer with yet another alternative form of the spacer positioning spring wherein its free end is oriented upstream from the opposite end thereof which is detachably clipped on an upper peripheral edge of the spacer outer strap.

As seen in the alternative forms of FIGS. 7-11, each spring can either be fixedly attached at one end to the spacer or clipped on a peripheral edge thereof. In FIGS. 7 and 8, the leaf spring 54 is fixedly attached at its one end 58, such as by welding, to the outer strap 56 of the spacer. The opposite free end 60 of the leaf spring 54 is spaced from the strap 56 so as to provide a small clearance therebetween. In FIG. 9, the leaf spring 54 is the same as in FIGS. 7 and 8, except that its free end 60 is disposed upstream relative to the direction of coolant/moderator fluid flow from its one rigidly attached end, whereas in FIGS. 7 and 8 the free end is located downstream from the attached end.

In FIG. 10 the spring 54' is detachably clipped on the lower peripheral edge of the spacer outer strap 56, whereas in FIG. 11 the spring is clipped on the upper peripheral edge of the strap. Thus, the free end 60' of the leaf spring 54' in FIG. 10 is disposed downstream relative to the direction of coolant/moderator fluid flow from the one clipped end thereof, whereas in FIG. 11 the free end 60' is located upstream.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a fuel assembly having a plurality of spaced fuel rods, an outer hollow tubular flow channel surrounding said fuel rods so as to direct flow of coolant/moderator fluid there-along, and at least one spacer being disposed along said channel and about said fuel rods so as to maintain them in side-by-side spaced relationship, an arrangement for disposing said spacer in a desired axial position along said fuel rods comprising:

a plurality of yieldably resilient springs disposed between an interior side of said outer channel and an exterior side of said spacer, said springs having an inherent spring bias directed away from said exterior sides of said spacers and toward said interior side of said channel such that by contact with said channel and spacer said springs assume states in which they are deflected away from said channel interior side so as to exert sufficient compressive contacting force thereon to maintain said spacer substantially stationary in said desired axial position along said fuel rods.

2. The fuel assembly as recited in claim 1, wherein each of said springs is an arcuate-shaped leaf spring.

3. The fuel assembly as recited in claim 1, wherein each of said springs extends generally parallel to the axial direction of said fuel rods.

4. The fuel assembly as recited in claim 3, wherein each of said springs is spaced apart from one another in a direction generally transverse to the axial direction of said fuel rods.

5. The fuel assembly as recited in claim 1, wherein each of said springs is fixedly attached to said spacer.

6. The fuel assembly as recited in claim 5, wherein each of said springs is clipped on an edge of said spacer.

7. The fuel assembly as recited in claim 1, wherein each of said springs has one end attached to said spacer and an opposite free end spaced outwardly from said spacer.

8. The fuel assembly as recited in claim 7, wherein said free end of said spring is disposed downstream relative to the direction of coolant/moderator fluid flow from said one end thereof being attached to said spacer.

9. The fuel assembly as recited in claim 7, wherein said free end of said element is disposed upstream relative to the direction of coolant/moderator fluid flow from said one end thereof being attached to said spacer.

10. In a fuel assembly having an array of spaced fuel rods, an outer tubular flow channel surrounding said fuel rods so as to direct flow of coolant/moderator fluid therealong, and a water cross extending through said channel and having a plurality of radially extending members dividing the array of fuel rods into a plurality of separate fuel rod mini-bundle subassemblies, each subassembly having a plurality of spacers being displaced from one another along the length of said subassembly between the bottom and top thereof and surrounding said fuel rods thereof so as to maintain them in side-by-side spaced relationship, an arrangement for disposing said spacers in desired axially spaced positions along said fuel rods, comprising:

a plurality of sets of arcuate-shaped springs, each set being spaced apart from one another in a direction generally parallel to the axial direction of said fuel rods, said springs in each set being spaced-apart from one another in a direction generally transverse to the axial direction of said fuel rods, some of said springs in each set being disposed between an interior side of said outer channel and an exterior side of one of said spacers, others of said springs in each set being disposed between exterior sides of said water cross members and said exterior side of said spacer, said springs contacting said spacers and either said channel or water cross member and exerting sufficient spring force thereon to maintain said spacers substantially stationary in said desired axial positions along said fuel rods, each of said springs having an inherent spring bias directed away from said exterior side of said respective spacer and toward said interior side of said channel or said exterior side of said respective water cross member such that by contact with said channel or water cross member and said spacer said spring assumes a state in which it is deflected away from said channel interior side or water cross member exterior side so as to exert such sufficient compressive contacting force thereon.

11. The fuel assembly as recited in claim 10, wherein each of said springs is fixedly attached to one of said spacers.

12. The fuel assembly as recited in claim 10, wherein each of said springs is clipped on an edge of one of said spacers.

13. The fuel assembly as recited in claim 10, wherein each of said springs has one end attached to said one spacer and an opposite free end spaced outwardly from said spacer.

14. The fuel assembly as recited in claim 13, wherein said free end of said spring is disposed downstream relative to the direction of coolant/moderator fluid flow from said one end thereof being attached to said spacer.

15. The fuel assembly as recited in claim 13, wherein said free end of said spring is disposed upstream relative to the direction of coolant/moderator fluid flow from said one end thereof being attached to said spacer.

* * * * *